United States Patent
Shi et al.

(10) Patent No.: US 11,240,693 B2
(45) Date of Patent: Feb. 1, 2022

(54) LINK QUALITY DETECTION METHOD AND TERMINAL DEVICE

(71) Applicant: GUANGDONG OPPO MOBILE TELECOMMUNICATIONS CORP., LTD., Guangdong (CN)

(72) Inventors: Zhihua Shi, Dongguan (CN); Wenhong Chen, Dongguan (CN); Zhi Zhang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 63 days.

(21) Appl. No.: 16/619,722

(22) PCT Filed: Feb. 5, 2018

(86) PCT No.: PCT/CN2018/075299
§ 371 (c)(1),
(2) Date: Dec. 5, 2019

(87) PCT Pub. No.: WO2019/148496
PCT Pub. Date: Aug. 8, 2019

(65) Prior Publication Data
US 2020/0205021 A1    Jun. 25, 2020

(51) Int. Cl.
*H04W 24/10* (2009.01)
*H04W 16/28* (2009.01)
(Continued)

(52) U.S. Cl.
CPC ........... *H04W 24/10* (2013.01); *H04W 16/28* (2013.01); *H04W 24/08* (2013.01); *H04W 80/02* (2013.01)

(58) Field of Classification Search
CPC . H04W 76/19; H04W 80/02; H04W 36/0058; H04W 36/0083; H04W 24/08;
(Continued)

(56) References Cited

U.S. PATENT DOCUMENTS

| 8,824,309 B2 | 9/2014 | Chen |
| 8,891,394 B2 * | 11/2014 | Jung ..................... H04W 24/08 370/252 |

(Continued)

FOREIGN PATENT DOCUMENTS

| CN | 1842195 A | 10/2006 |
| CN | 101257419 A | 9/2008 |

(Continued)

OTHER PUBLICATIONS

Meet In the Middle Cross-Layer Adaptation for Audiovisual Content Delivery by Ismail Djama; Toufik Ahmed; Abdelhamid Nafaa; Raouf Boutaba Published in: IEEE Transactions on Multimedia ( vol. 10, Issue: 1, Jan. 2008) (Year: 2008).*

(Continued)

*Primary Examiner* — William D Cumming
(74) *Attorney, Agent, or Firm* — Ladas & Parry LLP

(57) ABSTRACT

Presented is a method for detecting link quality and a terminal device. The method includes that: a terminal device receives a first event reported by a first protocol layer in a second protocol layer, the first event being configured to indicate that quality of a signal in a first signal set is poor enough to meet a first condition; and the terminal device determines that a second event occurs in the second protocol layer based on the first event, the second event being configured to indicate that quality of a link corresponding to the signal in the first signal set is poor enough to meet a second condition. The method and terminal device are favorable for improving signal transmission performance.

14 Claims, 3 Drawing Sheets

(51) Int. Cl.
*H04W 24/08* (2009.01)
*H04W 80/02* (2009.01)

(58) Field of Classification Search
CPC ..... H04W 24/04; H04W 24/10; H04W 76/15; H04W 72/042; H04W 74/0808
USPC .......................................................... 370/252
See application file for complete search history.

(56) References Cited

U.S. PATENT DOCUMENTS

| | | | | |
|---|---|---|---|---|
| 9,161,271 | B2* | 10/2015 | Jung | H04W 24/10 |
| 9,801,089 | B2* | 10/2017 | Jung | H04W 72/042 |
| 9,999,060 | B2 | 6/2018 | Kikuchi et al. | |
| 10,686,508 | B2* | 6/2020 | Nammi | H04B 17/336 |
| 11,019,659 | B2* | 5/2021 | Xu | H04W 74/0808 |
| 11,044,061 | B2* | 6/2021 | Takahashi | H04L 5/0048 |
| 11,064,567 | B2* | 7/2021 | Cui | H04W 72/042 |
| 2010/0113008 | A1 | 5/2010 | Wang | |
| 2012/0147755 | A1 | 6/2012 | Chen | |
| 2013/0083675 | A1 | 4/2013 | Shohei | |
| 2013/0095818 | A1 | 4/2013 | Levy et al. | |
| 2014/0273872 | A1 | 9/2014 | Levy et al. | |
| 2015/0009854 | A1* | 1/2015 | Jung | H04W 76/15 |
| | | | | 370/252 |
| 2015/0055488 | A1 | 2/2015 | Chen et al. | |
| 2016/0198481 | A1 | 7/2016 | Kikuchi et al. | |
| 2018/0084446 | A1 | 3/2018 | Li et al. | |
| 2019/0029073 | A1 | 1/2019 | Yiu et al. | |
| 2020/0052761 | A1* | 2/2020 | Nammi | H04B 7/0626 |
| 2020/0146063 | A1* | 5/2020 | Xu | H04W 74/0808 |
| 2020/0169901 | A1* | 5/2020 | Lindoff | H04L 1/20 |
| 2020/0205021 | A1* | 6/2020 | Shi | H04L 1/20 |
| 2020/0288334 | A1* | 9/2020 | Takeda | H04W 24/04 |
| 2020/0322890 | A1* | 10/2020 | Menon | H04W 24/10 |
| 2020/0344019 | A1* | 10/2020 | Da Silva | H04B 7/0626 |
| 2021/0022150 | A1* | 1/2021 | Nammi | H04W 72/10 |
| 2021/0022182 | A1* | 1/2021 | Mondal | H04W 80/08 |
| 2021/0029739 | A1* | 1/2021 | Shi | H04W 76/19 |
| 2021/0083914 | A1* | 3/2021 | Cao | H04W 4/70 |
| 2021/0099899 | A1* | 4/2021 | Wu | H04L 5/0048 |
| 2021/0112431 | A1* | 4/2021 | Kazmi | H04L 1/203 |
| 2021/0168636 | A1* | 6/2021 | Chen | H04W 76/19 |
| 2021/0185694 | A1* | 6/2021 | Hua | H04W 24/08 |

FOREIGN PATENT DOCUMENTS

| | | | |
|---|---|---|---|
| CN | 101998474 A | 3/2011 | |
| CN | 102572901 A | 7/2012 | |
| CN | 104303562 A | 1/2015 | |
| CN | 105379333 A | 3/2016 | |
| CN | 107005858 A | 8/2017 | |
| CN | 107438263 A | 12/2017 | |
| EP | 3751889 A1 * | 12/2020 | H04W 72/02 |
| KR | 101234035 B1 * | 5/2005 | |
| WO | 2010033957 A2 | 3/2010 | |
| WO | 2016168985 A1 | 10/2016 | |
| WO | 2017176376 A1 | 10/2017 | |
| WO | WO-2020108231 A * | 6/2020 | H04L 1/00 |

OTHER PUBLICATIONS

EEE Standards for Local and Metropolitan Area Networks: Supplement to Integrated Services (IS) LAN Interface at the Medium Access Control (MAC) and Physical (PHY) Layers: Specification of IsLAN16-T Published in: IEEE Std 802.9a-1995 (pp. 1-336) Feb. 27, 1996 (Year: 1996).*
M. A. Melnyk, A. Jukan and C. D. Polychronopoulos, "A Cross-Layer Analysis of Session Setup Delay in IP Multimedia Subsystem (IMS) With EV-DO Wireless Transmission," in IEEE Transactions on Multimedia, vol. 9, No. 4, pp. 869-881, Jun. 2007, doi: 10.1109/TMM.2007.895680. May 2007 (Year: 2007).*
Vivo, "Remaining details on mechanism to recover from beam failure", 3GPP TSG RAN WG1 Meeting #91 R1-1719770, issued on Dec. 1, 2017, pp. 1-6.
Medium Access Control (MAC) protocol specification (Release 15), 3GPP TS 38.321 V15.0.0, issued on Dec. 31, 2017, chapter 5.
Huawei, HiSilcon, "Beam failure recovery design details", 3GPP TSG RAN WG1 Meeting #90bis R1-1717302, Oct. 13, 2017, pp. 1-7.
First Office Action of the Chinese application No. 201880003243.7, dated Mar. 11, 2020.
Mediatek Inc: "RLM and RLF in HF NR", 3GPP Draft; R2-1700898, 3rd Generation Partnership Project (3GPP), Mobile Competence Centre; 650, Route Des Lucioles; F-06921 Sophia-Antipolis Cedex; France1, vol. RAN WG2, No. Athens, Greece; Feb. 13, 2017-Feb. 17, 2017, Feb. 12, 2017 (Feb. 12, 2017), XP051211677, Retrieved from the Internet: URL: http://www.3gpp.org/ftp/Meetings_3GPP_SYNC/RAN2/Docs/ [ retrieved on Feb. 12, 2017]*p. 2, paragraph 2.1-p. 4, paragraph 2.2.2 *figures 1, 2*.
Supplementary European Search Report in the European application No. 18903517.3, dated Oct. 9, 2020.
International Search Report in the international application No. PCT/CN2018/075299, dated Oct. 26, 2018.
Written Opinion of the International Search Authority in the international application No. PCT/CN2018/075299, dated Oct. 26, 2018.
Mediatek Inc:"Further Clarification on Beam Failure Recovery Procedure". 3GPP Draft: R2- 800652, Jan. 12, 2018,XP051386275.
First Office Action of the European application No. 18903517.3, dated Jun. 25, 2021.
Intel Corporation. "Discussion for Mechanism to Recover from Beam Failure", 3GPP TSG-RAN WG1 #89 R1-1707356, published on May 15-19, 2017.
Second Office Action of the Chinese application No. 201880003243.7, dated Jun. 11, 2020.

* cited by examiner

600

Receiving in a second protocol layer, by a terminal device, a first event reported by a first protocol layer, wherein the first event indicates that qualities of one or more signals in a first signal set meet a first condition, and the one or more signals in the first signal set comprise a channel state information reference signal (CSI-RS); wherein the qualities of the one or more signals in the first signal set meet the first condition, in case that a block error rate of each signal in the first signal set is greater than or equal to a second value ~610

Starting or restarting, by the terminal device, a second timer, whenever the first event is received in the second protocol layer, and receiving in the second protocol layer, by the terminal device, the first event within a duration of the second timer ~620

Adding, by the terminal device, 1 to a counter, when the terminal device receives the first event in the second protocol layer within the duration of the second timer ~630

Clearing, by the terminal device, the counter, when the terminal device does not receive the first event in the second protocol layer within the duration of the second timer ~640

Determining in the second protocol layer, by the terminal device, based on a counting condition of the counter, that a second event occurs, wherein the second event indicates that qualities of one or more links for the one or more signals in the first signal set meet a second condition ~650

FIG. 6

LINK QUALITY DETECTION METHOD AND TERMINAL DEVICE

RELATED APPLICATION

This application is an application under 35 U.S.C. 371 of International Application No. PCT/CN2018/0755299 filed on Feb. 5, 2018, the entire contents of which are incorporated herein by reference.

TECHNICAL FIELD

Embodiments of the application relate to the field of communications, and more particularly to a method for detecting link quality for detecting link quality and a terminal device.

BACKGROUND

In researches on 5th-Generation (5G) mobile communication technologies, the beamforming technology is an important technology for improving coverage and spectrum efficiency. As an antenna-array-based signal preprocessing technology, beamforming is used to generate directional beams by regulating weights of various antenna array elements in terms of signal transmission.

A network device may send multiple signals by adopting different beams. A terminal device may measure these signals received, thereby determining whether links for transmission of these signals are too bad to be available, namely determining whether the beams for transmitting these signals are available, i.e., determining whether there is any beam failure. Regarding how to determine a beam failure, there is yet no solution for reference.

SUMMARY

In view of this, the embodiments of the application provide a method for detecting link quality and a terminal device, which are favorable for improving performance of signal transmission.

A first aspect provides a method for detecting link quality, which may include that, a terminal device receives a first event reported by a first protocol layer in a second protocol layer, the first event indicating that qualities of one or more signals in a first signal set are poor enough to meet a first condition; and the terminal device determines, in the second protocol layer, based on the first event that a second event occurs, the second event indicating that qualities of one or more links for the one or more signals in the first signal set are poor enough to meet a second condition.

In a possible implementation mode, the operation that the terminal device determines in the second protocol layer based on the first event that the second event occurs may include that, the terminal device determines in the second protocol layer based on the number of times for which the first event is received that the second event occurs; and/or the terminal device determines, based on an occurrence condition of the first event within a duration of a first timer, that the second event occurs.

In a possible implementation mode, the method may further include that, the terminal device starts or restarts a second timer, whenever the first event is received in the second protocol layer, and the terminal device receives the first event in the second protocol layer within a duration of the second timer.

In a possible implementation mode, the method may further include the following operations. When the terminal device receives the first event in the second protocol layer within the duration of the second timer, the terminal device adds 1 to a counter. When the terminal device does not receive the first event in the second protocol layer within the duration of the second timer or the terminal device receives a third event in the second protocol layer within the duration of the second timer, the terminal device clean the counter. The third event indicates that the qualities of the one or more signals in the first signal set are high enough to meet a third condition. The operation that the terminal device determines in the second protocol layer, based on the number of times for which the first event is received, that the second event occurs may include that, the terminal device determines in the second protocol layer, based on a counting condition of the counter, that the second event occurs.

In a possible implementation mode, the operation that the terminal device determines in the second protocol layer, based on the counting condition of the counter, that the second event occurs may include that, when a value of the counter is greater than or equal to a first value, the terminal device determines that the second event occurs.

In a possible implementation mode, the method may further include the following operations. When the terminal device receives the first event in the second protocol layer within the duration of the second timer, the terminal device continues receiving the first event in the second protocol layer within the duration of the first timer. When the terminal device does not receive the first event in the second protocol layer within the duration of the first timer or the terminal device receives the third event in the second protocol layer within the duration of the second timer, the terminal device restarts the first timer. The third event indicates that the qualities of the one or more signals in the first signal set are high enough to meet the second condition, and the duration of the first timer is greater than the duration of the second timer.

In a possible implementation mode, the operation that the terminal device determines, based on the occurrence condition of the first event within the duration of the first timer, that the second event occurs may include that, when the first timer expires, the terminal device determines that the second event occurs.

In a possible implementation mode, the method may further include the following operations. The terminal device adds 1 to the counter, whenever the first event is received in the second protocol layer. When the terminal device receives a third event in the second protocol layer before a value of the counter reaches the first value, the terminal device clears the counter. The third event indicates that the qualities of the one or more signals in the first signal set are high enough to meet a third condition. The operation that the terminal device determines in the second protocol layer, based on the number of times for which the first event is received, that the second event occurs may include that, the terminal device determines, based on a counting condition of the counter, that the second event occurs.

In a possible implementation mode, the operation that the terminal device determines, based on the counting condition of the counter, that the second event occurs may include that, when the value of the counter is greater than or equal to the first value, the terminal device determines that the second event occurs.

In a possible implementation mode, the method may further include the following operations. The terminal device receives the first event in the second protocol layer within the duration of the first timer. When the terminal device receives a third event in the second protocol layer within the duration of the first timer, the terminal device restarts the first timer. The third event indicates that the qualities of the one or more signals in the first signal set are high enough to meet a third condition.

In a possible implementation mode, the operation that the terminal device determines, based on the occurrence condition of the first event within the duration of the first timer, that the second event occurs may include that, when the first timer expires, the terminal device determines that the second event occurs.

In a possible implementation mode, the method may further include that, the terminal device starts K timers, K being a positive integer, and the operation that the terminal device determines in the second protocol layer, based on the first event that the second event occurs may include that, the terminal device determines in the second protocol layer, based on a receiving condition of the first event within durations of the K timers, that the second event occurs.

In a possible implementation mode, K=1, and the operation that the terminal device determines in the second protocol layer, based on the receiving condition of the first event received within the durations of the K timers, that the second event occurs may include that, when a number of times for which the terminal device receives the first event within the duration of the timer is greater than or equal to the first value, the terminal device determines that the second event occurs.

In a possible implementation mode, K may be a positive integer greater than 1, a duration of a $j^{th}$ timer in the K timers may be smaller than a duration of a $(j+1)^{th}$ timer in the K timers, each of the K timers may correspond to a respective threshold, the threshold corresponding to the $j^{th}$ timer may be smaller than the threshold corresponding to the $(j+1)^{th}$ timer, and two successively started timers in the K timers may be overlapped with each other in terms of working time, where j is a positive integer smaller than K.

In a possible implementation mode, the operation that the terminal device determines in the second protocol layer, based on the receiving condition of the first event received within the durations of the K timers, that the second event occurs may include that, when a number of times for which the terminal device receives the first event in the second protocol layer within the duration of each of the K timers is greater than or equal to the threshold corresponding to the timer, the terminal device determines that the second event occurs.

In a possible implementation mode, the K timers may have a same starting time.

In a possible implementation mode, the method may further include the following operations. When the number of times for which the terminal device receives the first event in the second protocol layer within the duration of an $i^{th}$ timer in the K timers is greater than or equal to the threshold corresponding to the $i^{th}$ timer, the terminal device enables the counter to continue counting the first event received in the second protocol layer. When the number of times for which the terminal device receives the first event in the second protocol layer within the duration of the it timer in the K timers is smaller than the threshold corresponding to the ith timer, the terminal device clears the counter and restarts the K timers, where i is a positive integer less than or equal to K.

In a possible implementation mode, the first value may be configured by the terminal device or determined according to a configuration parameter of a network device.

In a possible implementation mode, the duration of the timer may be configured by the terminal device or determined according to a configuration parameter of a network device.

In a possible implementation mode, the qualities of the one or more signals in the first signal set are poor enough to meet the first condition, in case that a block error rate of each signal in the first signal set is greater than or equal to a second value.

In a possible implementation mode, the one or more signals in the first signal set may include a Channel State Information-Reference Signal (CSI-RS), and/or, a Synchronization Signal (SS)/Physical Broadcast Channel (PBCH) block.

In a possible implementation mode, the first protocol layer may be a physical layer, and the second protocol layer may be a high layer.

A second aspect provides a terminal device, which is configured to execute the method in the first aspect or any possible implementation mode of the first aspect. Specifically, the terminal device includes units configured to execute the method in the first aspect or any possible implementation mode of the first aspect.

A third aspect provides a terminal device, which includes a memory, a processor, an input interface and an output interface. Herein, the memory, the processor, the input interface and the output interface are connected through a bus system. The memory is configured to store instructions. The processor is configured to execute the instructions stored in the memory to execute the method in the first aspect or any possible implementation mode of the first aspect.

These aspects or other aspects of the application will become clearer and easier to understand through the following descriptions about the embodiments.

BRIEF DESCRIPTION OF DRAWINGS

FIG. 6 illustrates a schematic block diagram of a method for detecting link quality according to an embodiment of the application.

DETAILED DESCRIPTION

Figure 1:
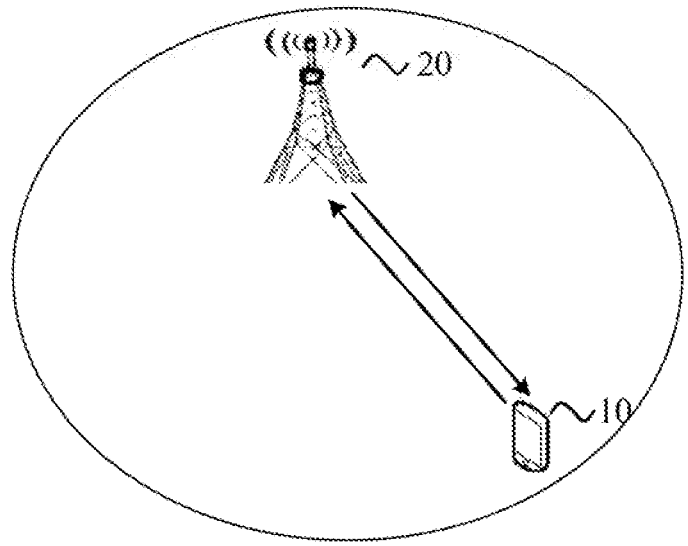
FIG. 1 illustrates a schematic diagram of an application scenario according to an embodiment of the application.

The technical solutions in the embodiments of the application will be clearly and completely described below in combination with the drawings in the embodiments of the application.

It is to be understood that the technical solutions of the embodiments of the application may be applied to various communication systems, for example, a Global System of Mobile communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system, New Radio (NR) or a future 5G system.

Particularly, the technical solutions of the embodiments of the application may be applied to communication systems based on various non-orthogonal multiple access technologies, for example, a Sparse Code Multiple Access (SCMA) system and a Low Density Signature (LDS) system. Of course, in the field of communication, the SCMA system and the LDS system may also have other names. Furthermore, the technical solutions of the embodiments of the application may be applied to multi-carrier transmission systems adopting non-orthogonal multiple access technologies, for example, Orthogonal Frequency Division Multiplexing (OFDM), Filter Bank Multi-Carrier (FBMC), Generalized Frequency Division Multiplexing (GFDM), or Filtered-OFDM (F-OFDM) systems adopting the non-orthogonal multiple access technologies.

In the embodiments of the application, a terminal device may be a User Equipment (UE), an access terminal, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device or another processing device connected to a wireless modem, a vehicle-mounted device, a wearable device, a UE in a future 5G network, a UE in a future evolved Public Land Mobile Network (PLMN) or the like. There are no limits made in the embodiments of the application.

In the embodiments of the application, a network device may be a device configured to communicate with the terminal device. The network device may be a Base Transceiver Station (BTS) in the GSM or the CDMA, or may be a NodeB (NB) in the WCDMA system, may also be an Evolutional Node B (eNB or eNodeB) in the LTE system, or may be a wireless controller in a Cloud Radio Access Network (CRAN) scenario. Or the network device may be a relay station, an access point, a vehicle-mounted device, a wearable device, a network device in the future 5G network, a network device in the future evolved PLMN or the like. There are no limits made in the embodiments of the application.

FIG. 1 illustrates a schematic diagram of an application scenario according to an embodiment of the application. The communication system in FIG. 1 may include a terminal device 10 and a network device 20. The network device 20 is configured to provide a communication service for access to a core network to the terminal device 10. The terminal device 10 searches for synchronization signals, broadcast signals and the like sent by the network device 20 to access the network, thereby communicating with the network. Arrows illustrated in FIG. 1 may represent uplink/downlink transmission implemented through a cellular link between the terminal device 10 and the network device 20.

Figure 2:
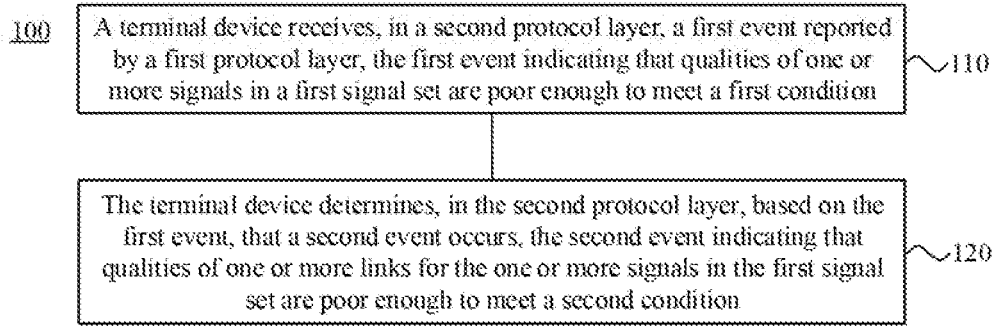
FIG. 2 illustrates a schematic block diagram of a method for detecting link quality according to an embodiment of the application.

FIG. 2 illustrates a schematic block diagram of a method for detecting link quality 100 according to an embodiment of the application. As illustrated in FIG. 2, the method 100 includes part or all of the following actions:

In S110, a terminal device receives, in a second protocol layer, a first event reported by a first protocol layer. The first event indicates that qualities of one or more signals in a first signal set are poor enough to meet a first condition.

In S120, the terminal device determines, in the second protocol layer, based on the first event, that a second event occurs. The second event indicates that qualities of one or more links for the one or more signals in the first signal set are poor enough to meet a second condition.

It is to be noted that, in the present disclosure, the first protocol layer may be a physical layer, and the second protocol layer may be a high layer. For example, the second protocol layer may be a Media Access Control (MAC) layer. It is to be understood that, for the signals in the first signal set in the present disclosure, the same sending beam may be adopted or different sending beams may be adopted. There are no limits made thereto in the embodiment of the present disclosure.

Specifically, after the terminal device receives signals of a certain signal set sent by a network device, the physical layer of the terminal device may measure the signals in the signal set, thereby determining qualities of one or more links for transmission of these signals. That is, it is determined whether a transmitting beam(s) for the signals in the signal set is(are) available. For example, it may be determined whether quality(ies) of the signal(s) in the signal set is(are) lower than a certain threshold. When the qualities of all the signals in the signal set are lower than the threshold during one measurement, it may be determined that the beam(s) for the signal set is(are) unavailable. Then, the physical layer of the terminal device may report this event to the high layer of the terminal device, namely informing the high layer that the beam(s) for the signal set measured this time is(are) unavailable. The terminal device may further determine whether the beam(s) is(are) really unavailable in the high layer based on the received event. For example, if the physical layer of the terminal device continuously measures the signals in the signal set for multiple times and multiple measurement results indicate that the sending beam(s) for the signal set is(are) unavailable, the physical layer of the terminal device continuously reports this event to the high layer, and the high layer may determine the sending beam(s) for the signal set is(are) really unavailable. When the high layer of the terminal device determines that the sending beam(s) for the signal set is(are) really unavailable, the terminal device may select a signal(s) with relatively high quality from another signal set for reporting to the network device, such that the network device may use a sending beam(s) for the signal(s) reported by the terminal device for subsequent signal transmission.

Therefore, the method for detecting link quality of the embodiment of the present disclosure is favorable for improving the performance of signal transmission.

It is to be understood that, in the embodiment of the present disclosure, the first event may be that qualities of all signals in the first signal set are poor enough to meet the first condition, or may be that the quality(ies) of part of the signals in the first signal set is(are) poor enough to meet the first condition and, for example, may be that the qualities of greater than 50% of the signals in the signal set are poor enough to meet the first condition. The embodiment of the present disclosure is not limited thereto.

Optionally, in the embodiment of the present disclosure, the operation that the terminal device determines, in the second protocol layer, based on the first event, that the second event occurs includes that, the terminal device determines in the second protocol layer, based on the number of times for which the first event is received, that the second event occurs; and/or the terminal device determines that the second event occurs based on an occurrence condition of the first event within a duration of a first timer.

The terminal device may determine, based on the number of times for which the first event is received in the high layer, that the second event occurs. For example, if the number of times for which the first event is received in the high layer is greater than or equal to a certain value, it may be determined that the second event occurs. Alternatively, the terminal device may determine that the second event occurs when the number of times for which the first event is received within a certain preset duration is greater than or equal to a certain value, or the terminal device may determine that the second event occurs when the number of times for which the first event is continuously received is greater than or equal to a certain value.

The terminal device may also determine that the second event occurs based on an occurrence condition of the first event within a preset duration. For example, the network device may set a timer in advance according to the number of times for which the first event occurs, and the terminal device may directly determine that the second event occurs when the timer expires or under the condition of timeout of the timer.

Optionally, in the embodiment of the present disclosure, the method further includes that, the terminal device starts or restarts a second timer whenever one such first event is received in the second protocol layer, and the terminal device receives the first event in the second protocol layer within a duration of the second timer. The operation that the terminal device determines, in the second protocol layer, based on the first event that the second event occurs includes that, the terminal device determines in the second protocol layer, based on the number of times for which the first event is continuously received, that the second event occurs; and/or the terminal device determines that the second event occurs based on a continuous occurrence condition of the first event within the duration of the first event.

The physical layer of the terminal device may periodically report the first event to the high layer, and if the first event is not reported for once, the high layer may be aware that the quality(ies) of the signal(s) in the first signal set measured this time meet(s) the first condition. The high layer of the terminal device may start a timer whenever receiving one such first event. The high layer of the terminal device, if receiving one such first event within the timer, may determine that the high layer continuously receives the first event. The high layer of the terminal device, if not receiving any first event within the timer, may determine that the high layer does not continuously receive the first event, and the high layer may determine occurrence of the second event again.

As an optional embodiment, if the physical layer of the terminal device learns that the quality(ies) of the signal(s) in the first signal set is(are) high enough to meet a second condition during a certain measurement, the physical layer may report a third event to the high layer, to inform the high layer that the quality(ies) of the signal(s) in the first signal set measured this time is(are) high, and the high layer, once receiving the third event, may determine occurrence of the second event again.

Furthermore, the terminal device may determine whether the second event occurs according to the number of times for which the first event is continuously received. For example, the terminal device may determine whether the number of times for which the first event is continuously received is greater than or equal to a first value. The first value may be configured by the terminal device or determined according to a configuration parameter of the network device. If the terminal device determines that the number of continuous receiving times is greater than or equal to the first value, the terminal device may determine that the sending beam(s) for the first signal set is(are) unavailable. If the terminal device determines that the number of continuous receiving times is smaller than the first value, the high layer of the terminal device may continue restarting a timer and receive the first event within a duration of the timer.

Furthermore, the terminal device may determine whether the second event occurs according to whether a duration when the first event is continuously received exceeds a preset value. For example, the terminal device may set a long timer and continuously receive the first event within the long timer. In case of timeout of the long timer, the terminal device may directly be determine that the second event occurs, that is, the terminal device may determine that the sending beam(s) for the first signal set is(are) unavailable. The high layer of the terminal device may keep continuously receiving the first event within the duration of the long timer till timeout of the long timer.

Optionally, in the embodiment of the present disclosure, the method further includes the following operations. If the terminal device receives the first event in the second protocol layer within the duration of the second timer, the terminal device may add 1 to a counter. If the terminal device does not receive the first event in the second protocol layer within the duration of the second timer or the terminal device receives a third event in the second protocol layer within the duration of the second timer, the terminal device may clear the counter, or may restart the second timer. The third event indicates that the quality(ies) of the signal(s) in the first signal set is(are) high enough to meet a third condition. The operation that the terminal device determines, in the second protocol layer, based on the number of times for which the first event is continuously received, that the second event occurs includes that, the terminal device determines in the second protocol layer, based on a counting condition of the counter, that the second event occurs.

Specifically, the terminal device may set a counter, an initial value of the counter being 0. Whenever the high layer receives one such first event, 1 is added to the counter, and a timer is started. If the next first event is received within a duration of the timer, the counter continues counting and the timer is restarted. If the next first event is not received or a third event is received within the duration of the timer, the counter may be cleared to start a new round of counting. When the value of the counter is greater than or equal to a certain value, the high layer may determine that the second event occurs.

As an optional embodiment, the terminal device may further set a counter, an initial value of the counter is a threshold. Whenever the high layer does not receive one such first event, 1 is subtracted from the counter, and a timer is started. If the next first event is received within a duration of the timer, the counter continues counting and the timer is restarted. If the next first event is not received or a third event is received within the duration of the timer, the counter may be reset to an initial value to start a new round of counting. When the value of the counter is equal to a certain value or equal to 0, the high layer may determine that the second event occurs. For example, the initial value of the counter at time t1 is 0; if first event 1 is received at time t2 after time t1, the terminal device may add 1 to the counter and start a timer; if first event 2 is received within a duration of the timer, the terminal device may continue adding 1 to the counter, restart the timer and wait for first event 3; and if the high layer of the terminal device continuously receives first event 5, it may be determined that the second event occurs. If the high layer does not receive the first event or receives the third event within the duration of the timer after first event 1, the terminal device may directly clear the counter and restart determination about the second event.

Optionally, in the embodiment of the present disclosure, the method further includes the following operations. If the terminal device receives the first event in the second protocol layer within the duration of the second timer, the terminal device continues receiving the first event in the second protocol layer within the duration of the first timer. If the terminal device does not receive the first event in the second protocol layer within the duration of the second timer or the terminal device receives the third event in the second protocol layer within the duration of the second timer, the terminal device restarts the first timer, or the terminal device may restart the second timer. The third event indicates that the quality(ies) of the signals in the first signal set is(are) high enough to meet the third condition, and the duration of the first timer is greater than the duration of the second timer.

Specifically, the terminal device may set two timers, i.e., a timer T1 and a timer T2, a duration of the timer T1 being greater than a duration of the timer T2. The terminal device may directly start the timer T1 or may start the timer T1 after the high layer receives a first event, and may start or restart the timer T2 whenever one such first event is received within the duration of the timer T1. If the high layer receives a first event within the duration of the timer T2, the timer T1 continues timing and the timer T2 is restarted. That is, the first event is continuously received within the duration of the timer T2. If the high layer does not receive the first event or receives a third event within the duration of the timer T2, the timer T1 is restarted, and in case of timeout of the timer T1, it may be determined that the second event occurs. It is to be understood that the duration of the timer T1 may be determined according to the number of the first event based on which whether the second event occurs is determined. For example, a period for reporting the first event by the physical layer is 10 ms, and if the number times of occurrence of the first event, based on which whether the second event occurs is determined, is determined as 5, the duration of the timer T1 may be set to be 50 ms or ms and the like.

Optionally, in the embodiment of the present disclosure, the method further includes that, the terminal device adds 1 to the counter whenever one such first event is received in the second protocol layer; and if the terminal device receives the third event in the second protocol layer before the value of the counter reaches the first value, the terminal device clears the counter. The third event indicates that the quality(ies) of the signal(s) in the first signal set is(are) high enough to meet the third condition; and the operation that the terminal device determines in the second protocol layer, based on the number of times for which the first event is received, that the second event occurs may include that, the terminal device determines, based on the counting condition of the counter, that the second event occurs.

The operation that the terminal device determines, based on the number of times for which the first event is received by the high layer, that the second event occurs may be implemented under the condition that the value of the counter reaches a preset value, for example, the initial value 0 is increased till a certain threshold or the initial value N is decreased till M, N being greater than M. If the high layer receives the third event before the value of the counter reaches M, the terminal device may directly clear the counter and restart a determination about the second event.

That is, the terminal device, once receiving the third event, reset the counter to the initial value.

Optionally, in the embodiment of the present disclosure, the method further includes that, the terminal device receives the first event in the second protocol layer within the duration of the first timer; and if the terminal device receives the third event in the second protocol layer within the duration of the first timer, the terminal device restarts the first timer. The third event indicates that the quality(ies) of the signal(s) in the first signal set is(are) high enough to meet the third condition.

The terminal device may also set a long timer, and when the third event is received within the long timer, the terminal device may directly restart the long timer and restart a determination about the second event. In case of timeout of the long timer, if the third event is not received within a duration of the timer, the terminal device may determine that the second event occurs.

It is to be understood that, in the embodiment of the present disclosure, the first condition, the second condition and the third condition may be the same determination condition. For example, the quality(ies) of the signal(s) in the first signal set may be compared with the same threshold or may be compared with different thresholds. There are no limits made thereto in the embodiment of the present disclosure.

Optionally, in the embodiment of the present disclosure, the method further includes that, the terminal device starts K timers, K being a positive integer. The operation that the terminal device determines in the second protocol layer, based on the first event, that the second event occurs includes that, the terminal device determines, in the second protocol layer, based on a receiving condition of the first event within durations of the K timers, that the second event occurs.

If K is 1, namely the terminal device starts one timer, the high layer may determine, based on the number of times for which the first event is received within the timer, whether the second event occurs.

Figure 3:
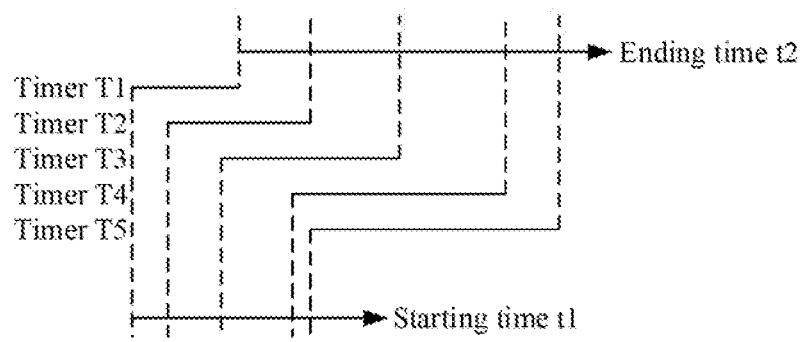
FIG. 3 illustrates a schematic diagram of start time and end time of each of K timers according to an embodiment of the application.

If K is an integer greater than 1, namely the terminal device may start multiple timers, the duration of the $j^{th}$ timer in the K timers is smaller than the duration of the $(j+1)^{th}$ timer in the K timers, each of the K timers corresponds to a respective threshold, the threshold corresponding to the $j^{th}$ timer is smaller than the threshold corresponding to the $(j+1)^{th}$ timer, and two successively started timers in the K timers are overlapped with each other in terms of working time, j being a positive integer and j being smaller than K. As illustrated in FIG. 3, K=5, the 5 timers include a timer T1, a timer T2, a timer T3, a timer T4 and a timer T5, t1 represents starting time of each timer, and t2 represents ending time of each timer. From FIG. 3, it can be seen that a duration of the timer T1<a duration of the timer T2<a duration of the timer T3<a duration of the timer T4<a duration of the timer T5. Moreover, two timers of which the starting time is continuous are overlapped with each other in terms of working time. The high layer of the terminal device may determine that the second event occurs according to the receiving condition of the first event within the durations of the 5 successively started timers. For example, a threshold may be set for each timer, and the high layer may determine whether the number of the first event received within a certain timer exceeds the threshold corresponding to the timer. If YES, the high layer may continue determining whether the number of the first event received within the duration of the next timer exceeds the threshold corresponding to the timer in case of timeout of the timer. If the high layer continuously determines that the numbers of the first event received within the durations of the 5 timers are greater than or equal to the corresponding thresholds, the high layer may determine that the second event occurs. The terminal device may set a counter for each timer to calculate the number of the first event received within the timer of the corresponding timer. If the high layer determines that the number of the first event received within the duration of a certain tinier is smaller than the corresponding threshold, the high layer may restart counting from the first timer. Optionally, the K timers has a same starting time. If the number of times for which the terminal device receives the first event in the second protocol layer within the duration of the ith timer in the K timers is greater than or equal to the threshold corresponding to the $i^{th}$ timer, the terminal device enables the counter to continue counting the first event received in the second protocol layer. If the number of times for which the terminal device receives the first event in the second protocol layer within the duration of the $i^{th}$ timer in the K timers is smaller than the threshold corresponding to the $i^{th}$ timer, the terminal device clears the counter and restarts the K timers, i being a positive integer less than or equal to K.

That is, the terminal device may simultaneously start the K timers. In such a case, counters may be set for the K timers. Then, the high layer may determine whether the number of the first event within each timer is greater than the corresponding threshold in case of timeout of the timer. If YES, the counters continues counting. If NO, the counters may be directly cleared, and the K timers are restarted to restart a determination about the second event.

Optionally, in the embodiment of the present disclosure, that the quality of the signal in the first signal set is poor enough to meet the first condition includes that a BLER of each signal in the first signal set is greater than or equal to a second value. That the quality of the signal in the first signal set is high enough to meet the third condition includes that the BLER of each signal in the first signal set is smaller than a third value. Herein, the second value and the third value may be the same, or may be different from each other.

It is to be understood that various thresholds, determination conditions, thresholds and the like in the embodiment of the present disclosure may all be configured by the terminal device, or may be determined according to a configuration parameter of the network device. It is also to be understood that the duration of each timer in the embodiment of the present disclosure may be configured by the terminal device, or may be determined according to the configuration parameter of the network device.

Optionally, in the embodiment of the present disclosure, the signal in the first signal set includes a CSI-RS, and/or, an SS/PBCH block. That is, the terminal device, responsive to detecting that the sending beam(s) for the first signal set is(are) unavailable, may measure a sending beam(s) for another signal set. When detecting an available beam, the terminal device may report an identifier of a CSI-RS or SS/PBCH block, for which the beam is used, to the network device. Therefore, the network device may be aware of the specific beam to be used for subsequent signal transmission according to the identifier of the signal.

It is to be understood that the term "greater than or equal to" mentioned in the embodiment of the present disclosure means that a value range of a certain object to be compared may be greater than, or equal to, or greater than or equal to another object. For example, it may be determined that the second event occurs when the value of the counter reaches a certain value, or the quality(ies) of the signal(s) may be compared with the threshold and it is determined that the second event occurs when the quality(ies) of the signal(s) is(are) greater than or equal to a certain value.

It is to be understood that interaction between the network device and the terminal device, and related properties, functions and the like described from the network device correspond to related properties and functions of the terminal device. Moreover, the related features have been described in detail in the method 100 and, for simplicity, will not be elaborated herein.

FIG. 6 illustrates a schematic block diagram of a method for detecting link quality 600 according to an embodiment of the application. As illustrated in FIG. 6, the method 600 includes part or all of the following actions.

In S610, a terminal device receives, in a second protocol layer, a first event reported by a first protocol layer, herein the first event indicates that qualities of one or more signals in a first signal set meet a first condition, and the one or more signals in the first signal set include a CSI-RS; herein the qualities of the one or more signals in the first signal set meet the first condition, in case that a block error rate of each signal in the first signal set is greater than or equal to a second value.

In S620, the terminal device starts or restarts a second timer, whenever the first event is received in the second protocol layer, and the terminal device receives, in the second protocol layer, the first event within a duration of the second timer.

In S630, the terminal device adds 1 to a counter, when the terminal device receives the first event in the second protocol layer within the duration of the second timer.

In S640, the terminal device clears the counter, when the terminal device does not receive the first event in the second protocol layer within the duration of the second timer.

In S650, the terminal device determines, in the second protocol layer, based on a counting condition of the counter, that a second event occurs, herein the second event indicates that qualities of one or more links for the one or more signals in the first signal set meet a second condition.

It is also to be understood that, in various embodiments of the present disclosure, a size of a sequence number of each process does not mean an execution sequence, and the execution sequence of each process should be determined by its function and an internal logic, and should not form any limit to an implementation process of the embodiments of the present disclosure.

The method for detecting link quality according to the embodiments of the present disclosure is described above in detail and a device for detecting link quality according to the embodiments of the present disclosure will be described below in combination with FIG. 4 and FIG. 5. The technical characteristics described in the method embodiment are applied to the following device embodiment.

Figure 4:
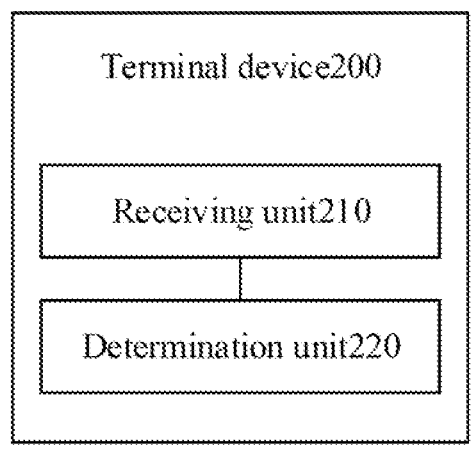
FIG. 4 illustrates a schematic block diagram of a terminal device according to an embodiment of the application.

FIG. 4 illustrates a schematic block diagram of a terminal device 200 according to an embodiment of the present disclosure. As illustrated in FIG. 4, the terminal device 200 includes a receiving unit 210 and a determination unit 220.

The receiving unit 210 is configured to receive a first event reported by a first protocol layer in a second protocol layer. The first event indicates that quality(ies) of a signal(s) in the first signal set is(are) poor enough to meet a first condition.

The determination unit 220 is configured to determine in the second protocol layer, based on the first event that a second event occurs. The second event indicates that quality(ies) of a link(s) for the signal(s) in the first signal set is poor enough to meet a second condition.

Therefore, the terminal device of the embodiment of the present disclosure is favorable for improving performance of signal transmission.

Optionally, in the embodiment of the present disclosure, the determination unit is specifically configured to determine in the second protocol layer, based on the number of times for which the first event is received, that the second event occurs; and/or determine, based on an occurrence condition of the first event within a duration of a first timer, that the second event occurs.

Optionally, in the embodiment of the present disclosure, the terminal device further includes a first timing unit, configured to start or restart a second timer whenever the first event is received in the second protocol layer; and the terminal device receives the first event in the second protocol layer within a duration of the second timer.

Optionally, in the embodiment of the present disclosure, the terminal device further includes a first counting unit, configured to, if the first event is received in the second protocol layer within the duration of the second timer, add 1 to a counter, or if the first event is not received in the second protocol layer within the duration of the second timer or a third event is received in the second protocol layer within the duration of the second timer, clear the counter. The third event indicates that the quality(ies) of the signal(s) in the first signal set is(are) high enough to meet a third condition. And, the determination unit is specifically configured to determine in the second protocol layer, based on a counting condition of the counter, that the second event occurs.

Optionally, in the embodiment of the present disclosure, the determination unit is specifically configured to, if a value of the counter is greater than or equal to a first value, determine that the second event occurs.

Optionally, in the embodiment of the present disclosure, the terminal device further includes a second timing unit, configured to, if the first event is received in the second protocol layer within the duration of the second timer, continue receiving the first event in the second protocol layer within the duration of the first timer, or if the first event is not received in the second protocol layer within the duration of the first timer or the third event is received in the second protocol layer within the duration of the second timer, restart the first timer. The third event indicates that the quality(ies) of the signal(s) in the first signal set is(are) high enough to meet the second condition, and the duration of the first timer is greater than the duration of the second timer.

Optionally, in the embodiment of the present disclosure, the determination unit is specifically configured to, if the first timer expires, determine, by the terminal device, that the second event occurs.

Optionally, in the embodiment of the present disclosure, the terminal device further includes a second counting unit, configured to, whenever the first event is received in the second protocol layer, add 1 to the counter, and if the third event is received in the second protocol layer before the value of the counter reaches the first value, clear the counter. The third event indicates that the quality(ies) of the signal(s) in the first signal set is(are) high enough to meet the third condition; and the determination unit is specifically configured to determine, based on the counting condition of the counter, that the second event occurs.

Optionally, in the embodiment of the present disclosure, the determination unit is specifically configured to, if the value of the counter is greater than or equal to the first value, determine that the second event occurs.

Optionally, in the embodiment of the present disclosure, the receiving unit is specifically configured to receive the first event in the second protocol layer within the duration of the first timer; and a third timing unit is configured to, if a third event is received in the second protocol layer within the duration of the first timer, restart the first tinier. The third event indicates that the quality(ies) of the signal(s) in the first signal set is(are) high enough to meet the third condition.

Optionally, in the embodiment of the present disclosure, the determination unit is specifically configured to, if the first timer expires, determine that the second event occurs.

Optionally, in the embodiment of the present disclosure, the terminal device further includes a fourth timing unit, configured to start K timers, K being a positive integer. And, the determination unit is specifically configured to determine in the second protocol layer, based on a receiving condition of the first event within durations of the K timers, that the second event occurs.

Optionally, in the embodiment of the present disclosure, K=1, and the determination unit is specifically configured to, if the number of times for which the first event is received within the duration of the timer is greater than or equal to the first value, determine that the second event occurs.

Optionally, in the embodiment of the present disclosure, K is a positive integer greater than 1, the duration of a $j^{th}$ timer in the K timers is smaller than the duration of a $(j+1)^{th}$ timer in the K timers, each timer in the K timers corresponds to a threshold, the threshold corresponding to the $j^{th}$ timer is smaller than the threshold corresponding to the (j+1) timer, and two successively started timers in the K timers are overlapped with each other in terms of working time, j being a positive integer and j being smaller than K.

Optionally, in the embodiment of the present disclosure, the determination unit is specifically configured to, if the number of times for which the first event is received in the second protocol layer within the duration of each timer in the K timers is greater than or equal to the threshold corresponding to the timer, determine that the second event occurs.

Optionally, in the embodiment of the present disclosure, the K timers have a same starting time.

Optionally, in the embodiment of the present disclosure, the terminal device further includes a third counting unit, configured to, if the number of times for which the terminal device receives the first event in the second protocol layer within the duration of an $i^{th}$ timer in the K timers is greater than or equal to the threshold corresponding to the ith timer, enable the counter to continue counting the first event received in the second protocol layer. Or, the third counting unit is configured to, if the number of times for which the first event is received in the second protocol layer within the duration of the ith timer in the K timers is smaller than the threshold corresponding to the ith timer, clear the counter and restart the K timers, i being a positive integer less than or equal to K.

Optionally, in the embodiment of the present disclosure, the first value is configured by the terminal device or determined according to a configuration parameter of a network device.

Optionally, in the embodiment of the present disclosure, the duration of the timer is configured by the terminal device or determined according to the configuration parameter of the network device.

Optionally, in the embodiment of the present disclosure, that the quality(ies) of the signal(s) in the first signal set is(are) poor enough to meet the first condition includes that a BLER of each signal in the first signal set is greater than or equal to a second value.

Optionally, in the embodiment of the present disclosure, the signal in the first signal set includes a CSI-RS, and/or, an SS/PBCH block.

Optionally, in the embodiment of the present disclosure, the first protocol layer is a physical layer, and the second protocol layer is a high layer.

It is to be understood that the terminal device 200 according to the embodiment of the present disclosure may correspond to the terminal device mentioned in the method embodiment of the present disclosure, and the abovementioned and other operations and/or functions of each unit in the terminal device 200 are adopted to implement the corresponding flows executed by the terminal device in the method in FIG. 2 respectively and will not be elaborated herein for simplicity.

Figure 5:
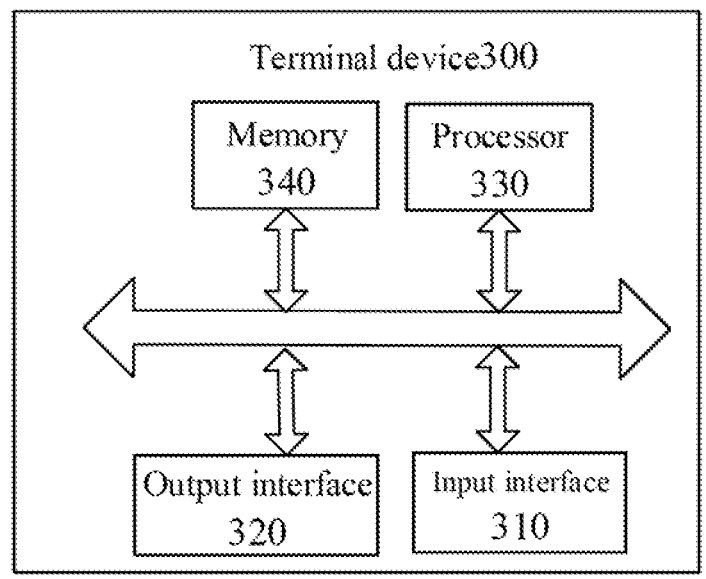
FIG. 5 illustrates another schematic block diagram of a terminal device according to an embodiment of the application.

As illustrated in FIG. 5, an embodiment of the present disclosure also provides a terminal device 300. The terminal device 300 may be the terminal device 200 in FIG. 4, and may be configured to execute contents of the terminal device corresponding to the method 100 in FIG. 2. The terminal device 300 includes an input interface 310, an output interface 320, a processor 330 and a memory 340. The input interface 310, the output interface 320, the processor 330 and the memory 340 may be connected through a bus system. The memory 340 is configured to store a program, an instruction or a code. The processor 330 is configured to execute the program instruction or code in the memory 340 to control the input interface 310 to receive a signal, control the output interface 320 to send a signal and complete operations in the method embodiments.

Therefore, the terminal device of the embodiment of the present disclosure is favorable for improving signal transmission performance.

It is to be understood that, in the embodiment of the present disclosure, the processor 330 may be a Central Processing Unit (CPU) and the processor 330 may also be another universal processor, a Digital Signal Processor (DSP), an Application Specific Integrated Circuit (ASIC), a Field Programmable Gate Array (FPGA) or another programmable logic device, discrete gate or transistor logic device and discrete hardware component and the like. The universal processor may be a microprocessor or the processor may also be any conventional processor and the like.

The memory 340 may include a Read-Only Memory (ROM) and a Random Access Memory (RAM) and provides an instruction and data for the processor 330. A part of the memory 340 may further include a nonvolatile RAM. For example, the memory 340 may further store information of a device type.

In an implementation process, each content of the method may be completed by an integrated logic circuit of hardware in the processor 330 or an instruction in a software form. The contents of the method disclosed in combination with the embodiments of the present disclosure may be directly embodied to be executed and completed by a hardware processor or executed and completed by a combination of hardware and software modules in the processor. The software module may be located in a mature storage medium in this field such as a RAM, a flash memory, a ROM, a programmable ROM or electrically erasable programmable ROM and a register. The storage medium is located in the memory 340. The processor 330 reads information in the memory 340 and completes the contents of the method in combination with hardware. No more detailed descriptions will be made herein to avoid repetitions.

In a specific implementation mode, a determination unit, timing unit and counting unit in the terminal device 300 may be implemented by the processor 330 in FIG. 5, and a receiving unit in the terminal device 300 may be implemented by the input interface 310 in FIG. 5.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the present disclosure.

Those skilled in the art may clearly learn about that specific working processes of the system, device and unit described above may refer to the corresponding processes in the method embodiment and will not be elaborated herein for convenient and brief description.

In some embodiments provided by the present disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the present disclosure may be integrated into a processing unit, each unit may also physically exist independently, and two or more units may also be integrated into a unit.

When being realized in form of software functional unit and sold or used as an independent product, the function may also be stored in a computer-readable storage medium. Based on such an understanding, the technical solutions of the present disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of each embodiment of the present disclosure. The storage medium includes: various media capable of storing program codes such as a U disk, a mobile hard disk, a ROM, a RAM, a magnetic disk or an optical disk.

The above is only the specific implementation mode of the present disclosure and not intended to limit the scope of protection of the present disclosure. Any variations or replacements apparent to those skilled in the art within the technical scope disclosed by the present disclosure shall fall within the scope of protection of the present disclosure. Therefore, the scope of protection of the present disclosure shall be subject to the scope of protection of the claims.

The invention claimed is:

1. A method for detecting link quality, comprising:
receiving in a second protocol layer, by a terminal device, a first event reported by a first protocol layer, wherein the first event indicates that qualities of one or more signals in a first signal set meet a first condition, and the one or more signals in the first signal set comprise a channel state information reference signal (CSI-RS); wherein the qualities of the one or more signals in the first signal set meet the first condition, in case that a block error rate of each signal in the first signal set is greater than or equal to a second value;
starting or restarting, by the terminal device, a second timer, whenever the first event is received in the second protocol layer, and receiving in the second protocol layer, by the terminal device, the first event within a duration of the second timer;
adding, by the terminal device, 1 to a counter, when the terminal device receives the first event in the second protocol layer within the duration of the second timer;
clearing, by the terminal device, the counter, when the terminal device does not receive the first event in the second protocol layer within the duration of the second timer; and
determining in the second protocol layer, by the terminal device, based on a counting condition of the counter, that a second event occurs, wherein the second event indicates that qualities of one or more links for the one or more signals in the first signal set meet a second condition.

2. The method of claim 1, further comprising:
determining, by the terminal device, based on an occurrence condition of the first event within a duration of a first timer, that the second event occurs.

3. The method of claim 1, wherein determining in the second protocol layer, by the terminal device, based on the counting condition of the counter, that the second event occurs comprises:
determining, by the terminal device, that the second event occurs, when a value of the counter is greater than or equal to a first value.

4. The method of claim 3, wherein the first value is configured by the terminal device or determined according to a configuration parameter of a network device.

5. The method of claim 2, wherein the duration of the timer is configured by the terminal device or determined according to a configuration parameter of a network device.

6. The method of claim 1, wherein the first protocol layer is a physical layer, and the second protocol layer is a Media Access Control (MAC) layer.

7. A terminal device, comprising:
an input interface, configured to receive a first event reported by a first protocol layer in a second protocol layer, wherein the first event indicates that qualities of one or more signals in a first signal set meet a first condition, and the one or more signals in the first signal set comprise a channel state information reference signal (CSI-RS); wherein the qualities of the one or more signals in the first signal set meet the first condition, in case that a block error rate of each signal in the first signal set is greater than or equal to a second value;
a processor, configured to:
start or restart a second timer, whenever the first event is received in the second protocol layer, wherein the terminal device receives the first event in the second protocol layer within a duration of the second timer;
add 1 to a counter when the first event is received in the second protocol layer within the duration of the second timer;
clear the counter, when the first event is not received in the second protocol layer within the duration of the second timer; and
determine in the second protocol layer, based on a counting condition of the counter, that a second event occurs, wherein the second event indicates that qualities of one or more links for the one or more signals in the first signal set meet a second condition.

8. The terminal device of claim 2, wherein the processor is further configured to:
determine, based on an occurrence condition of the first event within a duration of a first timer, that the second event occurs.

9. The terminal device of claim 7, wherein the processor is configured to:
if the value of the counter is greater than or equal to a first value, determine that the second event occurs.

10. The terminal device of claim 8, wherein the processor is further configured to:
continue receiving the first event in the second protocol layer within the duration of the first timer, when the first event is received in the second protocol layer within the duration of the second timer, or
restart the first timer, when the first event is not received in the second protocol layer within the duration of the first timer, wherein the duration of the first timer is greater than the duration of the second timer.

11. The terminal device of claim 10, wherein the processor is configured to:
determine that the second event occurs, when the first timer expires.

12. The terminal device of claim 9, wherein the first value is configured by the terminal device or determined according to a configuration parameter of a network device.

13. The terminal device of claim 8, wherein the duration of the timer is configured by the terminal device or determined according to a configuration parameter of a network device.

14. The terminal device of claim 7, wherein the first protocol layer is a physical layer, and the second protocol layer is a Media Access Control (MAC) layer.

* * * * *